United States Patent [19]

Cheng

[11] Patent Number: 4,629,615
[45] Date of Patent: Dec. 16, 1986

[54] COUNTER-ROTATIONAL FLOW IN A CARBON BLACK REACTOR

[75] Inventor: Paul J. Cheng, Bartlesville, Okla.

[73] Assignee: Phillips Petroleum Company, Bartlesville, Okla.

[21] Appl. No.: 633,769

[22] Filed: Sep. 17, 1984

Related U.S. Application Data

[62] Division of Ser. No. 391,896, Jun. 24, 1982, Pat. No. 4,501,720.

[51] Int. Cl.[4] ........................... C09C 1/48; C09C 1/50
[52] U.S. Cl. .................................... 423/456; 422/150; 423/450
[58] Field of Search .............. 422/150, 193, 156, 226, 422/229; 423/455, 456, 450, 449, 458; 366/165, 239

[56] References Cited

U.S. PATENT DOCUMENTS

| 2,515,813 | 7/1950 | Wiant . |
| 2,628,674 | 2/1953 | Fore . |
| 2,785,054 | 3/1957 | Bethea et al. . |
| 3,619,141 | 11/1971 | Henderson . |
| 3,897,217 | 7/1975 | Cheng . |
| 3,986,836 | 10/1976 | Cheng . |
| 4,007,016 | 2/1977 | Weber . |
| 4,013,420 | 3/1977 | Cheng . |
| 4,053,142 | 10/1977 | Johannes . |
| 4,294,814 | 10/1981 | Cheng . |
| 4,313,921 | 2/1982 | Cheng . |
| 4,321,248 | 3/1982 | Cheng . |

FOREIGN PATENT DOCUMENTS 634695 1/1962 Canada .

Primary Examiner—Barry S. Richman
Assistant Examiner—William R. Johnson
Attorney, Agent, or Firm—Stephen E. Reiter

[57] ABSTRACT

A method for producing carbon black employing a carbon black reactor which comprises
 a cylindrical precombustion zone;
 a combustion gas introduction means adapted to tangentially introduce combustion gas into the cylindrical precombustion zone; and
 a cylindrical reaction zone in open communication with the cylindrical precombustion zone, wherein the axis of rotation of the cylindrical reaction zone and the axis of rotation of the cylindrical precombustion zone are substantially collinear, where the method comprises tangentially introducing a combustion gas into the cylindrical precombustion zone of the carbon black to create a spiralling flow and subjecting a portion of the spiralling flow to a counter-rotational force within the cylindrical precombustion zone; wherein the counter-rotational force is created by a helix-shaped fin positioned at least partially within the cylindrical precombustion zone; and wherein the helix-shaped fin is rotated about its axis by a motorized means thereby facilitating the creation of the counter-rotational force.

7 Claims, 4 Drawing Figures

COUNTER-ROTATIONAL FLOW IN A CARBON BLACK REACTOR

This application is a division of application Ser. No. 391,896, filed June 24, 1982, now U.S. Pat. No. 4,501,720 issued Feb. 20, 1985.

My invention relates to a carbon black reactor and to a method for producing carbon black. Another aspect of my invention relates to a means and a method for promoting turbulence in a precombustion zone to improve mixing of combustion gases and feedstock.

BACKGROUND OF THE INVENTION

Carbon black can be successfully produced by pyrolytically decomposing a hydrocarbon feedstock, such as natural gas or petroleum oil, in a furnace. The heat for this thermal decomposition is usually generated by hot combustion gases, such as the combustion products of natural gas and air. One furnace that has proven to be very efficient in producing carbon black from a hydrocarbon oil feedstock is the vortex flow carbon black reactor. This reactor has a cylindrical precombustion zone in open communication with a cylindrical reaction zone. The axis of rotation of the cylindrical precombustion zone and the axis of rotation of the cylindrical reaction zone are substantially collinear. The diameter of the precombustion zone is greater than that of the reaction zone. The reactor also includes a means for axially introducing a hydrocarbon feedstock into the reactor and a means for tangentially introducing combustion gases into the precombustion zone. Thermal decomposition of the feedstock occurs by contact with the combustion gases.

SUMMARY OF THE INVENTION

It is desired to produce a high tint carbon black. It is further desired to produce a carbon black having a relatively large surface area per unit weight. In accordance with this invention and in order to produce a high yield of carbon black having these characteristics a means is provided in the precombustion chamber to promote mixing of the hydrocarbon feedstock and the combustion gases. More particularly a means is positioned around the hydrocarbon feedstock introduction means to convert a portion of the tangential combustion gas flow in the precombustion zone into a counter-rotational flow. This counter-rotational flow will in turn produce greater turbulence and thus promote mixing of feedstock and combustion gases.

The counter-rotational flow of combustion gases can be created by a helix-shaped fin fixed to a feedstock introduction means such as a conduit with a nozzle. A portion of the tangentially introduced rotating combustion gases, upon striking the helix-shaped fin, will be redirected into a counter-rotational flow. The incompatability of the counter-rotational flow and the original rotational flow will create turbulence and promote mixing of hydrocarbon feedstock nd combustion gases.

OBJECTS OF THE INVENTION

It is an object of this invention to provide a method and apparatus to promote the mixing of a feedstock and hot combustion gases in a carbon black reactor.

It is a further object of this invention to provide a method and apparatus for creating a counter-rotational flow from a portion of the rotating hot combustion gases in a carbon black reactor.

It is another object of this invention to produce a high tint carbon black having a large surface area per unit weight.

These and other objects and advantages of my invention will become apparent from this disclosure and the appended claims.

DETAILED DESCRIPTION OF THE INVENTION

Figure 1:
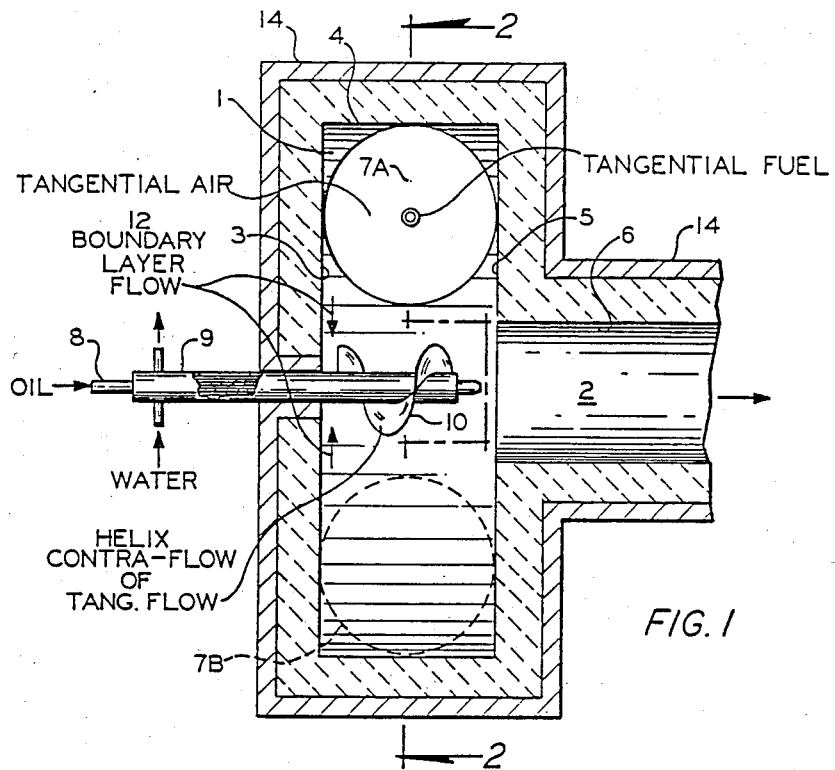
FIG. 1 depicts the side view of a typical vortex flow carbon black reactor having the present invention incorporated therein.
Figure 2:
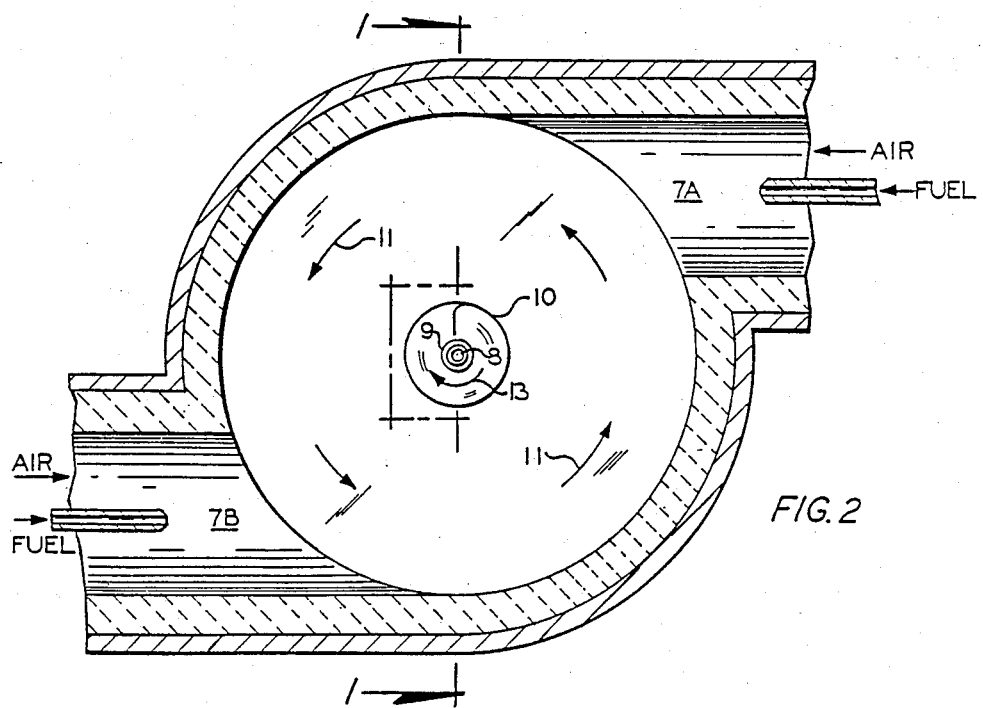
FIG. 2 illustrates counter-rotational flow of combustion gases within the carbon black reactor of FIG. 1.

FIGS. 1 and 2 depict a vortex flow oil furnace carbon black reactor and illustrate an embodiment of my invention. The reactor is confined by walls made of conventional refractory material, e.g., mullite or alumina. A cylindrical precombustion zone 1 is in open communication with a cylindrical reaction zone 2. The cylindrical precombustion zone 1 and the cylindrical reaction zone 2 share a common axis of rotation. The precombustion zone 1 is confined by an upstream wall 3, a cyclindrical wall 4, and a downstream wall 5. Attached to wall 5 is a cylindrically shaped wall 6 that confines the reaction zone 2. The walls are surrounded by a metal shell 14.

Combustion gases are tangentially introduced through the openings or tangential tunnels 7a and 7b into the precombustion zone 1. Combustion product gases can either be produced shortly before they reach the precombustion zone 1 or produced inside of the precombustion zone 1 by tangentially introducing a fuel gas (e.g. methane) and air and igniting the mixture in the precombustion zone 1. The drawings illustrate the separate introduction of air and fuel into the tangential tunnels 7a and 7b. For purpose of nomenclature in this disclosure and the appended claims the term "combustion gases" is broadly defined to include the combustion products and/or the combustion reactants (i.e., fuel and air).

Hydrocarbon feedstock (e.g., oil) enters the precombustion zone 1 through an axially aligned inlet 8 that extends into the precombustion zone 1. An optional coaxial conduit 9 provides a water jacket to protect the feedstock means from being overheated by the hot combustion gases.

In the precombustion zone 1, surrounding the inlet 8 and fixed to the water jacket 9, is a continuous helix-shaped fin 10 aligned along the axis of rotation of the precombustion zone 1.

The tangentially introduced combustion gases assume a counterclockwise rotational motion in the precombustion zone 1. This counterclockwise rotational motion is depicted by the arrows 11 in FIG. 2. Note that this rotational motion is counterclockwise only from the perspective of one downstream looking upstream. If one looks downstream from an upstream position the motion is clockwise. For the purposes of this disclosure clockwise and counterclockwise orientations are determined from the perspective of one positioned downstream looking upstream. A view corresponding to this perspective is shown in FIG. 2.

The hot spiraling combustion gases tend to move downstream and into contact with the hydrocarbon feedstock. The feedstock is pyrolytically decomposed into carbon black in the reaction zone 2.

Generally about 25 to 33% of the tangentially introduced combustion gas stream flows along the front wall 3 of the precombustion zone 1 toward the axis of the reactor. This boundary layer flow is indicated by arrows 12 in FIG. 1. At the axis (defined by feedstock inlet 8) this gas stream tends to flow downstream in an axial direction. The counterclockwise rotational motion of the stream around inlet 8 is redirected by the stationary left hand screw helix-shaped fin 10 to assume a clockwise rotational motion. This clockwise rotational motion is illustrated by the arrows 13 in FIG. 2. In effect, the helix-shaped fin creates a counter-rotational flow 13. Turbulence is produced between the two opposing rotational flows, i.e. between the clockwise flow 13 and the counterclockwise flow 11. The turbulence promotes rapid mixing of the hydrocarbon feedstock and the hot combustion gases thus producing a high tint carbon black with a relatively large surface area per unit weight. The desirability of good mixing becomes even more evident with increased reactor size.

The invention is illustrated above using counterclockwise flow 11 and clockwise flow 13. These flows are "contraflows" and the invention can also be successfully practiced using a clockwise flow 11 and a counterclockwise flow 13 to effect the desired opposing rotational flows.

Figure 3:
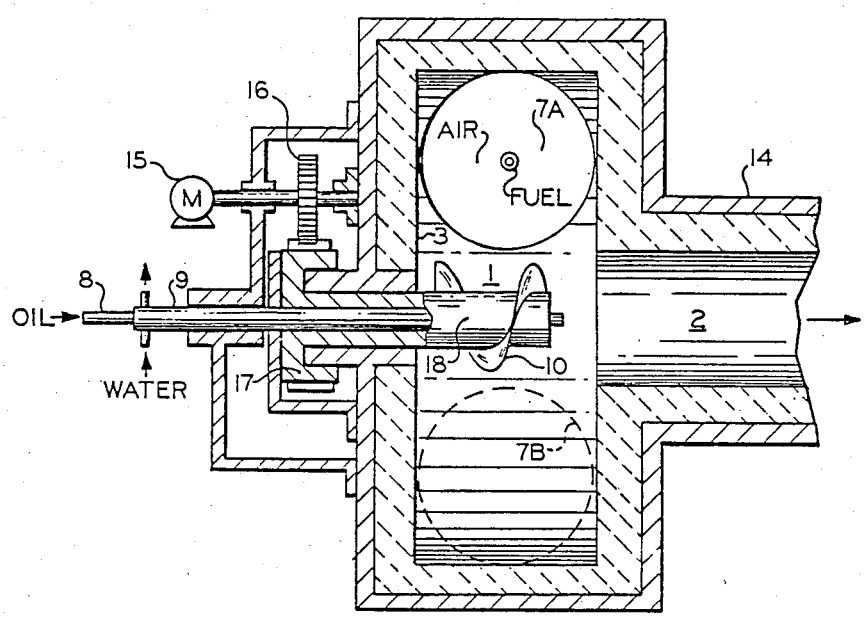
FIG. 3 shows a motorized helix-shaped fin in a vortex flow carbon black reactor.

In another embodiment of this invention the fin is rotated to facilitate creation of the counter-rotational flow. The rotation of the fin can be driven by a motor. FIG. 3 depicts one such possible motorized arrangement in a typical vortex flow carbon black reactor. A motor 15 rotates a gear 16 which engages gear teeth 17 on a rotatable fin support means 18. The helix-shaped fin 10 is attached to the rotatable fin support means 18 and can be rotated about its axis in either direction as dictated by the rotational direction imparted by the motor 15 to the system.

Any mechanical means for rotating the fin is within the scope of this invention. A person of ordinary skill in the art, given this disclosure, possesses the requisite knowledge and ability to construct a motorized system suitable to effectuate the desired results.

The essence of this invention resides in the use of a means to convert a portion of the rotational flow of the tangentially introduced combustion gases into a counter-rotational flow thereby creating within the carbon black reactor a "contraflow" condition that promotes mixing of feedstock and combustion gases. This counter-rotational flow inducing means may be the presently preferred continuous and stationary helix-shaped fin shown in FIG. 1, the motorized helix-shaped fin shown in FIG. 3 or any other type, arrangement, or shape of a baffle or baffles sufficient to create a counter-rotational flow. It is presently preferred that the baffle or baffles of this counter-rotational flow creating baffle system be aligned along the axis of rotation of the precombustion zone.

When a helix-shaped fin is employed it is preferred that the axis of rotation of the fin and the axis of rotation of the cylindrical precombustion zone be substantially collinear. The helix may be a left hand screw helix (as shown in FIG. 1) or a right hand screw helix depending upon the orientation needed to create the desired counter-rotational flow. The radius of the helix can be constant (as shown in FIG. 1) or can vary. It is preferred that the radius of the helix not be so great as to interfere adversely with the tangential introduction of combustion gas into the precombustion zone.

In accordance with the method of this invention a portion of the spiralling flow created by the tangential introduction of combustion gas is subjected to a counter-rotational force within the precombustion zone. The counter-rotational force is any force that has a counter-rotational influence on the affected portion of the spiralling flow. This counter-rotational force can be created, for example, by a stationary helix fin since upon striking the fin the affected flow tends to assume a counter-rotational motion. Any means capable of creating this counter-rotational force is suitable for the purposes of my invention.

Details with respect to reactor design, reaction conditions, feedstocks, heat exchange materials, fuel, etc. are well known in the art and do not unduly limit the scope of any aspect of this invention.

Figure 4:
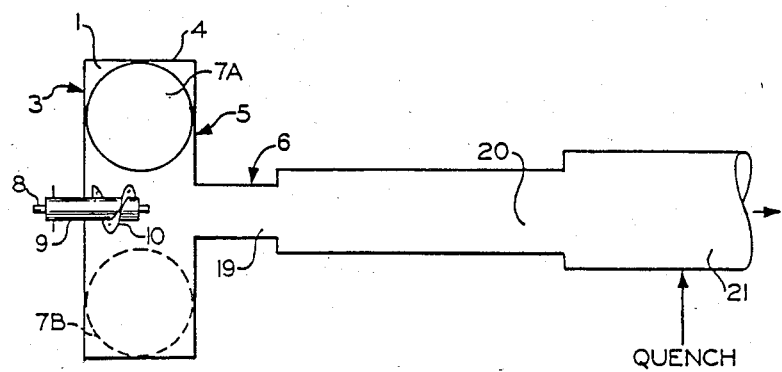
FIG. 4 shows typical dimensions for a carbon black reactor.

A typical carbon black operation is calculated and set forth below. FIG. 4 defines the dimensions of the reactor under consideration.

| TYPICAL OPERATION (Calculated) | |
|---|---|
| I APPARATUS (See FIG. 4) | |
| Reactor: | |
| Precombustion Zone (PCZ) (1): | |
| Diameter, inches, | 38 |
| Length, inches, | 12 |
| Tangential Tunnels (7a and 7b) | 12 |
| Diameter, inches, | |
| Reactor Tube: | |
| Diameter (19), inches, | 10 |
| Length, inches, | 16 |
| Diameter (20), inches, | 12 |
| Length, inches | 40 |
| Diameter (21), inches | 15 |
| Length to quench, inches, | 14 |
| Total Length from outlet of PCZ to quench locus, inches, | 70 |
| Left Hand Screw Helix (10): | |
| Diameter, inches, | 5 |
| Length, inches, | 8 |
| Pitch, inches, | 5[a] |
| Thickness of blade of helix, inches, | ⅛ |
| Oil Nozzle Means: | |
| Diameter, inches, | 3[b] |
| Nozzle Outlet locus, inches, | 9[c] |
| II PROCESS | |
| Total tangential air, SCF/hr, | 190,000 |
| Temperature, °F., | 1,100 |
| Pressure, psig, | 9 |
| Total tangential fuel (CH$_4$), SCF/hr, | 11,400 |
| Temperature, °F., | 80 |
| Pressure, psig, | 30 |
| Feedstock, gallons/hour, | 410 |
| API gravity, 60° F./60° F., | −1.4 |
| Mid-boiling point, °F., | 850 |
| BMCI, | 126 |
| Temperature, °F., | 300 |

| Estimated Product: | Without Helix | With Helix |
|---|---|---|
| Yield, lbs/gal, | 5.2 | 5.2 |
| CTAB, m$^2$/g, | 96 | 102 |

(CTAB: ASTM D3765-80)
[a] Axial length for one revolution of helix blade;
[b] Outside diameter of water jacket;
[c] From upstream face of PCZ.

The drawings and example have been given to better describe my invention and to set forth the best mode of operation. They should not be construed to limit the scope of my invention as defined by the appended claims.

This disclosure is intended to be a full and accurate description of my invention, however, reasonable modifications of and variations from this disclosure are contemplated to be within the scope of patent protection desired and sought.

I claim:

1. A method for producing carbon black employing a carbon black reactor which comprises
   (a) a cylindrical precombustion zone;
   (b) a combustion gas introduction means located so as to tangentially introduce combustion gas into said cylindrical precombustion zone; and
   (c) cylindrical reaction zone in open communication with said cylindrical precombustion zone, wherein the axis of rotation of said cylindrical reaction zone and the axis of rotation of said cylindrical precombustion zone are substantially collinear, said method comprising
   tangentially introducing a combustion gas into the cylindrical precombustion zone of said carbon black reactor to create a spiralling flow and subjecting a portion of said spiralling flow to a counter-rotational force within said cylindrical precombustion zone; wherein said counter-rotational force is created by a helix-shaped fin positioned at least partially within said cylindrical precombustion zone; wherein the axis of rotation of said helix-shaped fin and the axis of rotation of said cylindrical precombustion zone are substantially collinear; and wherein said helix-shaped fin is rotated about its axis by a motorized means thereby facilitating the creation of said counter-rotational force.

2. A method in accordance with claim 1 wherein said helix-shaped fin is a continuous helix-shaped fin.

3. A method in accordance with claim 2 wherein said helix-shaped fin is attached to the outside of a conduit adapted to introduce a feedstock into said carbon black reactor.

4. A method for producing high tint carbon black in a carbon black reactor which comprises:
   (a) a cylindrical precombustion zone into which combustion gas is tangentially introduced and hydrocarbon feedstock is axially introduced;
   (b) a combustion gas introduction means located so as to tangentially introduce combustion gas into said cylindrical precombustion zone;
   (c) a cylindrical reaction zone in open communication with said cylindrical precombustion zone; wherein the axis of rotation of said cylindrical reaction zone and the axis of rotation of said cylindrical precombustion zone are substantially collinear;
   (d) a helix-shaped fin at least partially located within said cylindrical precombustion zone; wherein the axis of rotation of said helix-shaped fin and the axis of rotation of said cylindrical precombustion zone are substantially collinear; and
   (e) a motorized means for rotating said helix-shaped fin about its axis;
   said method comprising tangentially introducing a combustion gas into said carbon black reactor, and flowing a portion of said combustion gas axially along said rotating helix-shaped fin.

5. A method in accordance with claim 4 wherein said helix-shaped fin is a continuous helix-shaped fin.

6. A method in accordance with claim 4 wherein said carbon black reactor further comprises
   (f) a conduit at least partially within said cylindrical precombustion zone for introducing a feedstock into said carbon black reactor; wherein the axis of rotation of said conduit and the axis of said helix-shaped fin are substantially collinear; and wherein said helix-shaped fin is outside of said conduit.

7. A method in accordance with claim 6 wherein said helix-shaped fin is a continuous helix-shaped fin.

* * * * *